May 21, 1968 J. WITT 3,384,044
INSERT MEMBER FOR DISHED TANK BOTTOMS IN SHIPS
Filed March 24, 1967 2 Sheets-Sheet 1
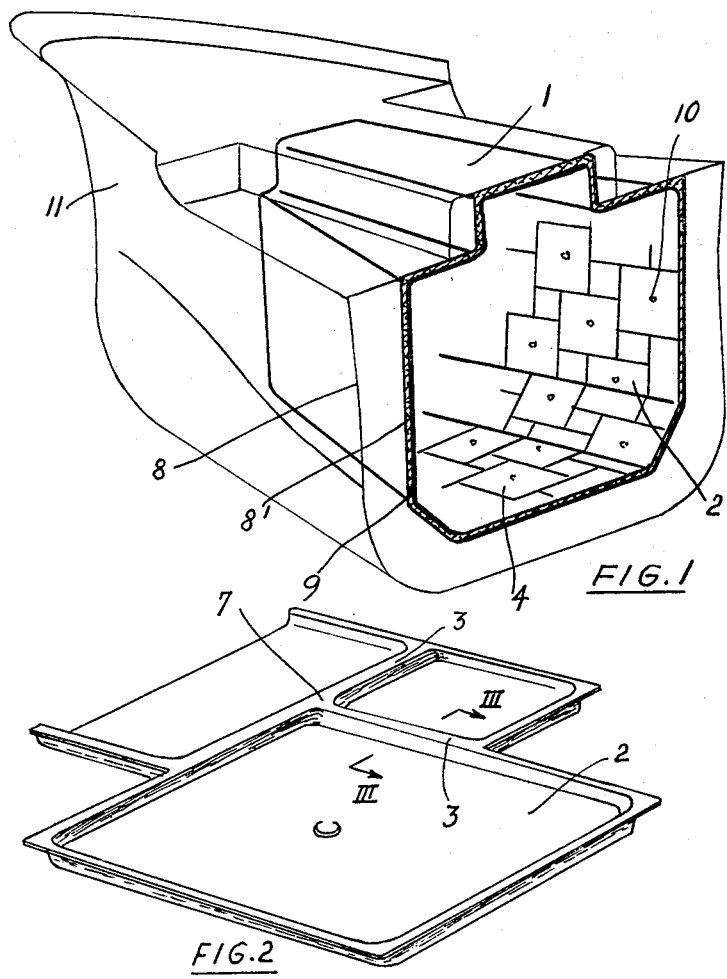
INVENTOR:
JOHANNES WITT
BY *Lowry Rinehart*
ATTORNEYS

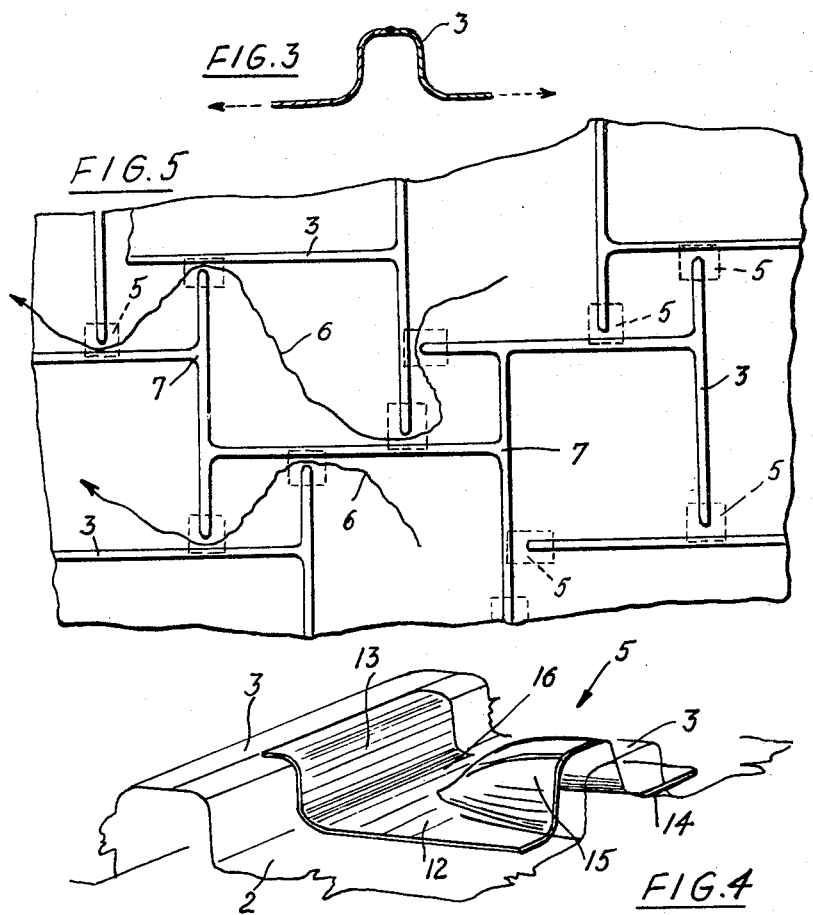

United States Patent Office 3,384,044
Patented May 21, 1968

3,384,044
INSERT MEMBER FOR DISHED TANK BOTTOMS IN SHIPS
Johannes Witt, Kiel-Dietrichsdorf, Germany, assignor, by mesne assignments, to Howaldtswerke-Deutsche Werft Aktiengesellschaft Hamburg und Kiel, Kiel-Dietrichsdorf, Germany, a firm
Filed Mar. 24, 1967, Ser. No. 625,681
Claims priority, application Germany, Apr. 1, 1966, K 58,909
1 Claim. (Cl. 114—74)

ABSTRACT OF THE DISCLOSURE

A cargo tank having an insert member which is welded to an expansion joint so as to provide drainage for residual cargo.

---

This invention relates to an insert member for dished plate elements interconnected by expansion joints and forming the tank bottom of a ship, which insert member can be welded in at the junction of the expansion joints of a plurality of dished plate elements.

Ships for carrying liquefied gases at atmospheric pressure may be provided with tanks which are not of the self-supporting type. Such tanks preferably consist of thin fluid-tight diaphragms. These diaphragms—so-called plate elements—are placed on insulating means and secured to the ship's structural parts by mounting means.

Such tanks must be designed so that the contraction and elongation to which the tank material is subject on loading and unloading, respectively, can reliably be controlled.

Designs meeting these requirements chiefly consist of standard type deep-drawn dished plate elements forming, after being welded together, expansion folds or joints adapted to compensate the contraction and elongation to which the material is subjected respectively upon loading and unloading the cold cargo.

However, in the dished plate elements of the tank bottom which are required for reasons of thermic elasticity there will always remain a residue of the cargo which cannot be discharged by the existing discharging means. Reducing the depth of the dished plate elements and thus the amount of residual cargo is not possible for thermoelastic reasons. The residual amount of cargo must be discharged from the dished plate elements of the tank bottom within a short period of time in cases, for example, of cargo changes, inspection, repair and the like.

This can be achieved in different ways. For example, the rear walls of the tanks may be heated with hot inert gases flowing through the expansion joints, thereby to gasify such residual amount of cargo which will then be sucked off.

Another possibility of eliminating such remainders is that of evacuating each plate element by suction applied through a widely ramified tubing system.

All these solutions involve considerable expenditure of both cost and structure. The more complicated such a secondary bilging system is, the more it is subject to trouble. So, the fouling of the bottom also affects the heating effect.

The object of the present invention is to eliminate these drawbacks and to provide for automatic drainage of the dished plate elements.

To attain this object the present invention provides an insert member which is characterized by a plate having one edge in the form of a substantially Z-shaped flange corresponding to half the expansion joint of substantially inverted channel section formed between two adjacent dished plate elements, and an expansion fold of substantially inverted channel section in the opposite edge portion increasing in width towards said opposite edge, said expansion fold projecting from the plane of the plate on the same side thereof as the Z-shaped flange to which it extends at right angles.

An embodiment of the invention will now be described by way of example and with reference to the accompanying drawings, in which:

FIG. 1 is a schematic perspective view of a ship's tank in cross section;

FIG. 2 is a similar view of dished plate elements;

FIG. 3 is a vertical cross section taken on the line III—III of FIG. 2;

FIG. 4 is a perspective view of the insert member, and

FIG. 5 is a top plan view of part of the tank bottom and showing the drainage paths for the residual liquid.

Referring to the drawings, FIG. 1 shows a tank 1 provided in a ship 11 and intended for carrying liquefied gases at atmospheric pressure. The tank 1 consists of fluid-tight thin diaphragms, so-called deep-drawn dished plate elements 2, which are welded together. The dished plate elements 2 are placed on an insulating layer 9 and are secured to the ship's structural parts 8 and 8' by mounting means 10. Between the individual dished plate elements 2 expansion joints 3 are formed for compensating thermal elongation and contraction of the material, as shown in FIGS. 2 through 5.

After having discharged the tank 1 there will always remain a residue of the liquid on the bottom 4 of the tank 1 which cannot be discharged with the available discharging installation because the expansion joints 3 formed by the edges of the dished plate elements 2 prevent the residual liquid from collecting.

By the provision of insert members 5 which are welded in recesses at the junction 7 of the expansion joints 3 of several dished plate elements 2 drainage paths 6 are provided in the longitudinal direction of the tank 1 which is coincident with the longitudinal axis of the ship. The sternward trimming of the ship which will always occur during unloading permits of completely automatic drainage of the dished plate elements 2 without the aid of any mechanical or thermal expedients. The automatic drainage of the dished plate elements 2 can be ensured by the incorporation of the insert members 5. The drainage paths 6 may end in a cavity at one point of the bottom 4 of the tank 1 where the residual liquid can be sucked off by a discharging pump.

The insert members 5 may be incorporated in the tank system wherever this is required. The thermally elastic tank system remains unchanged because the insert members 5 are formed so that they do not affect the elastic properties of the tank lining, i.e. they have the same elastic properties as the connections normally existing in a tank.

The insert member 5 consists of a plate 12 one edge portion of which is formed as a Z-shaped flange 13 covering half the inverted channel provided by the expansion joint 3 between adjacent dished plate elements 2. The edge 14 opposite the Z-shaped flange 13 of the plate 12 is provided with an expansion fold 15 of inverted channel cross section gradually increasing in width towards the edge 14, which expansion fold 15 extends at right angles to the Z-shaped flange 13. The expansion fold 15 fits over the expansion joint 3 to which it is welded. By the expansion fold 15 starting in the plate 12 a flow channel 16 is formed which constitutes part of the drainage path 6.

The tank system itself is not impaired by the insert members 5 since these have the same thermoelastic properties as the junctions 7 in the tank 1.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

I claim:

1. An insert member for dished plate elements interconnected by expansion joints and forming the tank bottom of a ship, which insert member can be welded in at the junction of the expansion joints of a plurality of dished plate elements, characterized by a plate having one edge in the form of a substantially Z-shaped flange corresponding to half the expansion joint of substantially inverted channel section formed between two adjacent dished plate elements, and an expansion fold of substantially inverted channel section in the opposite edge portion increasing in width towards said opposite edge, said expansion fold projecting from the plane of the plate on the same side thereof as the Z-shaped flange to which it extends at right angles.

References Cited

UNITED STATES PATENTS 2,963,873  12/1960  Stowers _____ 114—74 X
3,039,418  6/1962  Versluis _____ 114—74

FERGUS S. MIDDLETON, *Primary Examiner.*

T. M. BLIX, *Assistant Examiner.*